(12) United States Patent
Mohan et al.

(10) Patent No.: US 10,572,834 B2
(45) Date of Patent: Feb. 25, 2020

(54) PREDICTING A FUTURE STATE OF A BUILT ENVIRONMENT

(71) Applicant: enLighted, Inc., Sunnyvale, CA (US)

(72) Inventors: Tanuj Mohan, Mountain View, CA (US); Vijayalakshmi Krishnamurthy, Sunnyvale, CA (US)

(73) Assignee: Enlighted, Inc., Sunnyvale, CA (US)

( * ) Notice: Subject to any disclaimer, the term of this patent is extended or adjusted under 35 U.S.C. 154(b) by 729 days.

(21) Appl. No.: 14/732,704

(22) Filed: Jun. 6, 2015

(65) Prior Publication Data

US 2016/0356633 A1 Dec. 8, 2016

(51) Int. Cl.
*G06Q 10/06* (2012.01)
*G01D 21/02* (2006.01)
*G06Q 10/04* (2012.01)

(52) U.S. Cl.
CPC ............ *G06Q 10/06* (2013.01); *G01D 21/02* (2013.01); *G06Q 10/04* (2013.01)

(58) Field of Classification Search
CPC .................................................. G06Q 10/06
See application file for complete search history.

(56) References Cited

U.S. PATENT DOCUMENTS

| 2,883,255 | A | * | 4/1959 | Anderson | ................ B41J 11/36 |
| | | | | | 340/518 |
| 5,101,141 | A | | 3/1992 | Warner et al. | |
| 5,179,324 | A | | 1/1993 | Audbert | |
| 5,191,265 | A | | 3/1993 | D'Aleo et al. | |
| 5,283,516 | A | | 2/1994 | Lohoff | |
| 5,812,422 | A | | 9/1998 | Lyons | |
| 6,057,654 | A | | 5/2000 | Cousy et al. | |
| 6,188,181 | B1 | | 2/2001 | Sinha et al. | |
| 6,342,994 | B1 | | 1/2002 | Cousy et al. | |
| 6,548,967 | B1 | | 4/2003 | Dowling et al. | |
| 7,309,985 | B2 | | 12/2007 | Eggers et al. | |
| 7,348,736 | B2 | | 3/2008 | Piepgras et al. | |
| 7,437,596 | B2 | | 10/2008 | McFarland | |
| 7,382,271 | B2 | | 12/2008 | McFarland | |
| 7,550,931 | B2 | | 6/2009 | Lys et al. | |
| 7,566,137 | B2 | | 7/2009 | Veskovic | |
| 7,623,042 | B2 | | 11/2009 | Huizenga | |
| 7,792,956 | B2 | | 9/2010 | Choong et al. | |
| 7,925,384 | B2 | | 4/2011 | Huizenga et al. | |
| 8,344,660 | B2 | | 1/2013 | Mohan et al. | |
| 8,457,793 | B2 | | 6/2013 | Golding et al. | |

(Continued)

*Primary Examiner* — Manuel A Rivera Vargas
*Assistant Examiner* — Yaritza H Perez Bermudez

(57) ABSTRACT

Apparatuses, methods and systems for predicting a future state of a built environment with a sensor network are disclosed. One sensor network includes a plurality of sensors of a built environment and a controller. Each sensor is operative to generate a sense signal. The controller is operative to collect sense values that represent sense signals of the plurality of sensors, wherein the sense values are collected over time, classify each of the collected sense values based on a type of space of the built environment associated with a corresponding one of the plurality of sensors that generated the sense value, based on a timing of the sense value, and based on other available information of the built environment, predict a future state of each of the plurality of sensors based at least in part on the classifications of each of the sense values, and communicate the future state.

23 Claims, 5 Drawing Sheets

(56) References Cited

U.S. PATENT DOCUMENTS

| Patent/Pub No. | Date | Inventor | Classification |
|---|---|---|---|
| 8,461,778 B2 | 6/2013 | Mohan et al. | |
| 8,493,209 B2 | 7/2013 | Mohan et al. | |
| 8,558,466 B2 | 10/2013 | Basil et al. | |
| 8,587,219 B2 | 11/2013 | Mohan et al. | |
| 8,587,225 B2 | 11/2013 | Ashar et al. | |
| 2004/0002792 A1 | 10/2004 | Hoffknecht | |
| 2005/0169643 A1 | 8/2005 | Franklin et al. | |
| 2005/0278047 A1 | 12/2005 | Ahmed | |
| 2006/0275040 A1 | 12/2006 | Franklin | |
| 2007/0057807 A1 | 3/2007 | Walters et al. | |
| 2007/0061050 A1 | 3/2007 | Hoffknecht | |
| 2007/0086128 A1 | 4/2007 | Lane et al. | |
| 2007/0215794 A1 | 9/2007 | Cernasov et al. | |
| 2008/0185597 A1 | 8/2008 | Veskovic et al. | |
| 2008/0244104 A1 | 10/2008 | Clemente | |
| 2008/0265796 A1 | 10/2008 | Null | |
| 2009/0026966 A1 | 1/2009 | Budde et al. | |
| 2009/0179596 A1 | 7/2009 | Willaert et al. | |
| 2009/0195161 A1 | 8/2009 | Lane et al. | |
| 2010/0025483 A1* | 2/2010 | Hoeynck | H02J 3/14 236/1 C |
| 2010/0034386 A1 | 2/2010 | Choong et al. | |
| 2010/0135186 A1 | 6/2010 | Choong et al. | |
| 2010/0264846 A1 | 10/2010 | Chemal et al. | |
| 2010/0270933 A1 | 10/2010 | Chemal et al. | |
| 2010/0295482 A1 | 11/2010 | Chemal et al. | |
| 2010/0301777 A1 | 12/2010 | Chemal et al. | |
| 2011/0031897 A1 | 2/2011 | Henig et al. | |
| 2011/0199010 A1 | 8/2011 | Henig et al. | |
| 2012/0299485 A1* | 11/2012 | Mohan | H05B 37/0218 315/153 |
| 2013/0088168 A1* | 4/2013 | Mohan | G05B 15/02 315/297 |
| 2014/0072211 A1* | 3/2014 | Kovesi | G06T 7/90 382/164 |
| 2014/0184083 A1* | 7/2014 | Pelton | H05B 37/0245 315/152 |
| 2015/0005951 A1* | 1/2015 | Srinivasan | G05B 15/02 700/275 |
| 2015/0076993 A1* | 3/2015 | Mohan | G01S 5/0027 315/153 |
| 2015/0178865 A1* | 6/2015 | Anderson | G05B 17/02 705/7.25 |
| 2016/0004237 A1* | 1/2016 | Mohan | F24F 11/30 700/275 |
| 2016/0098024 A1* | 4/2016 | Purandare | G06Q 30/0201 700/275 |
| 2016/0219676 A1* | 7/2016 | Mohan | H05B 37/0218 |
| 2016/0286624 A1* | 9/2016 | Patel | H05B 37/0218 |

* cited by examiner

Collecting sense values that represent sense signals of the plurality of sensors of a built environment, wherein the sense values are collected over time

310

Predicting a future state of each of the plurality of sensors based at least in part on a type of space of the built environment associated with a corresponding one of the plurality of sensors that generated the sense value, based on a timing of the sense value, and based on other available information of the built environment

320

Communicating the future state

PREDICTING A FUTURE STATE OF A BUILT ENVIRONMENT

FIELD OF THE EMBODIMENTS

The described embodiments relate generally to environmental control systems. More particularly, the described embodiments relate to methods, apparatuses and systems for predicting a future state of a built environment.

BACKGROUND

Intelligent lighting and environmental control systems reduce power consumption of lighting and environmental control while improving the experience of occupants of structures that utilize the lighting and environmental control systems. A factor utilized in controlling the systems is determination of occupancy and tracking of motion. Further, the occupancy and motion tracking can be used for controlling the environmental control systems.

It is desirable to have a method, system and apparatus for predicting a future state of a built environment.

SUMMARY

An embodiment includes a sensor network. The sensor network includes a plurality of sensors of a built environment and a controller. Each sensor is operative to generate a sense signal. The controller is operative to collect sense values that represent sense signals of the plurality of sensors, wherein the sense values are collected over time, classify each of the collected sense values based on a type of space of the built environment associated with a corresponding one of the plurality of sensors that generated the sense value, based on a timing of the sense value, and based on other available information of the built environment, predict a future state of each of the plurality of sensors based at least in part on the classifications of each of the sense values, and communicate the future state.

Another embodiment includes a sensor network. The sensor network includes a plurality of sensors of a built environment and a controller. Each sensor is operative to generate a sense signal. The controller is operative to collect sense values that represent sense signals of the plurality of sensors, wherein the sense values are collected over time, predict a future state of each of the plurality of sensors based at least in part on a type of space of the built environment associated with a corresponding one of the plurality of sensors that generated the sense value, based on a timing of the sense value, and based on other available information of the built environment, and communicate the future state.

Another embodiment includes a method of predicting a state of a built environment. The method includes generating sense signals by a plurality of sensors, collecting sense values that represent the sense signals of the plurality of sensors, wherein the sense values are collected over time, classifying each of the collected sense values based on a type of space of the built environment associated with a corresponding one of the plurality of sensors that generated the sense value, based on a timing of the sense value, and based on other available information of the built environment, predicting a future state of each of the plurality of sensors based at least in part on the classifications of each of the sense values, and communicating the future state.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 3 is a flow chart that includes steps of another method predicting a state within a built environment, according to an embodiment.

DETAILED DESCRIPTION

Figure 1:
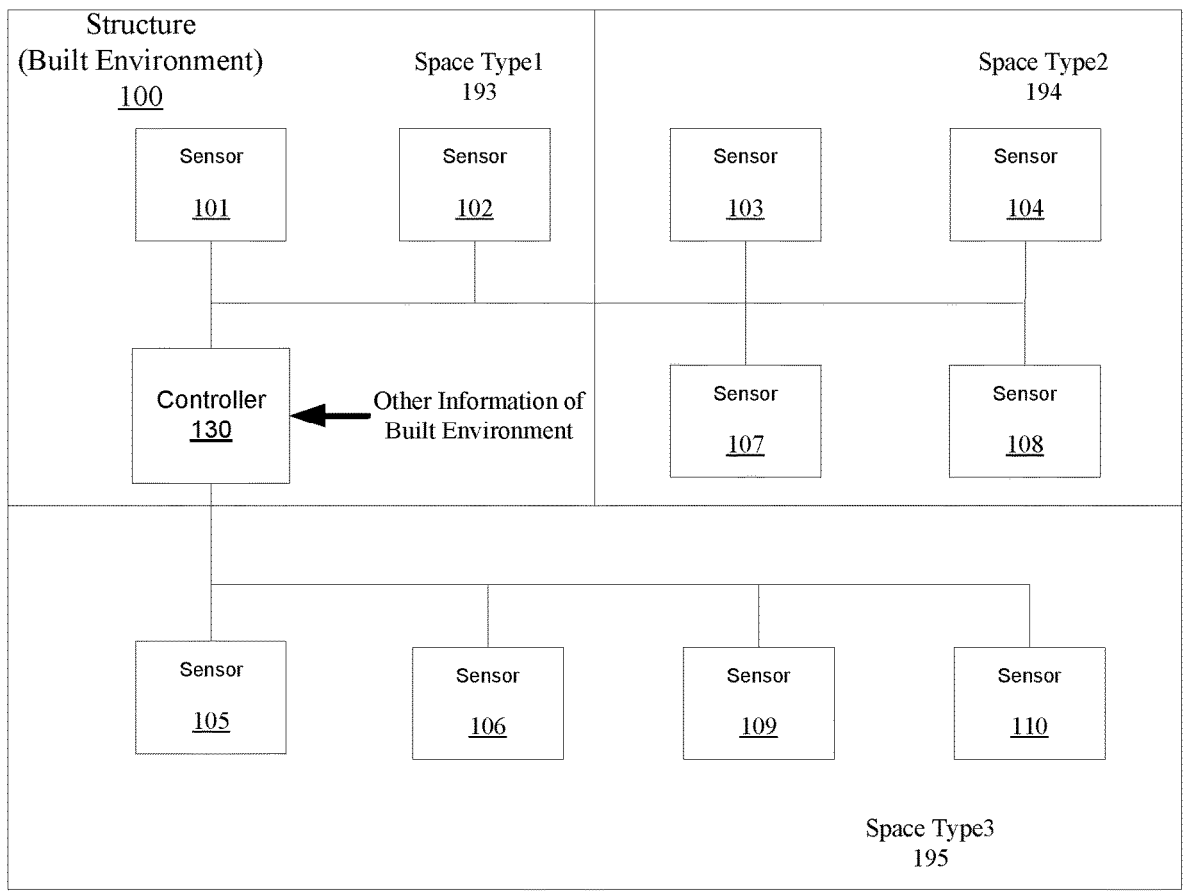
FIG. 1 shows a sensor network for predicting a state within a built environment, according to an embodiment.

As shown in the drawings, the described embodiments provide methods, apparatuses, and systems for predicting a state of a built environment. At least some of the described embodiments include sensor distributed within the built environment. Based on sense signal of the sensor, timing of the sense signals and other available information of the built environment, a future state of the built environment is predicted. For at least some embodiments, the predicted state includes a predicted occupancy status and level of occupancy of the built environment at a point in time after sensing the signals. For at least some embodiments, the predicted state to predict energy consumption and/or space utilization.

FIG. 1 shows a sensor network for predicting a state within a built environment 100, according to an embodiment. For at least some embodiments, the sensor network includes a plurality of sensors 101-110 of the built environment 100.

For at least some embodiments, the built environment includes an area utilized. Such areas include, for example, office buildings, building structures, parking lots, parking structures, stadiums, schools etc. It is to be understood that this is not an exhaustive list of possible built environments.

The built environment includes structures such as office buildings, parking structures, stadiums, and schools etc.

Each of the sensors is operative to generate a sense signal. Exemplary sensors include light sensors (such as, passive infrared (PIR), ambient light sensors), motion sensors, temperature sensors, air quality sensors, image sensors. For an embodiment, the sensor includes device tracking via BLE (Blue-Tooth Low Energy) communication. It is to be understood that this is not an exhaustive list of possible sensors.

For at least some embodiments, the sensor network includes a controller 130. While the controller 130 of FIG. 1 is shown as a standalone controller, it is to be understood that the functionality of the controller 130 can be distributed amongst any number of controllers, computers or server. For an embodiment, the sensors 101-110 are associated with one or more building fixtures, wherein the one or more building fixtures include one or more controllers. For at least some embodiments, the one or more controllers of the one or more building fixtures are operative to perform the functionality of the controller 130.

For at least some embodiments, the controller 130 is operative to collect sense values that represent sense signals of the plurality of sensors, wherein the sense values are collected over time. The controller 130 is further operative to classify each of the collected sense values based on a type of space of the built environment associated with a corresponding one of the plurality of sensors that generated the sense value, based on a timing of the sense value, and based on other available information of the built environment. Further, the controller 130 is operative to predict a future state of each of the plurality of sensors based at least in part on the classifications of each of the sense values, and communicate the future state.

For at least some embodiments, the collected sense values are classified based on a type of space of the built environment associated with a corresponding one of the plurality of sensors that generated the sense value. That is, the plurality of sensors is distributed within the built environment 100. For an embodiment, the built environment 100 includes different types of spaces 193, 194, 195. For example, a space type1 193 may include a lobby, a space type2 194 may include an office, and a space type3 195 may include a conference room. Other possible space types include, for example, an open office, meeting rooms, private offices, corridors, lobby, cafeteria, class rooms etc. where one or a group of sensors are installed. For at least some embodiments, the different space types defined by one of a group of sensors is tracked, and can be used to classify the sensed values, because the space type of each of the sensors is useful in determining the future state of the space associated with each of the sensors. Generally, the space associated with a sensor includes the space that is within the coverage area of the sensor. For example, a sensor installed in a ceiling of the space with a particular lens could have a coverage floor area of 100 Sq. Ft. This means, the occupancy, energy and environmental controls are tracked and associated with 100 Sq. Ft of the space.

For at least some embodiments, the sensed values are collected over time. The time interval can be periodic, or aperiodic. For an embodiment, the sensed values are obtained (sensed) once every interval of time, for example, once every 10 minutes, once an hour or once a day. For another embodiment, obtaining the sensed values is triggered on sensing, for example, motion. For another embodiment, the sensed values or obtained both periodically and non-periodically.

For another embodiment, occupant activity using a BLE (Blue-Tooth Low Energy) device in the coverage area of sensor or in the neighborhood coverage area of sensor or in the influencing group's coverage area is sensed, and used to trigger obtaining of the sensed values. For at least some embodiments, an occupant's presence sensed by a BLE device in the coverage area of the sensor or in the neighborhood coverage area of the sensor or in the influencing group's coverage area triggers the obtaining of the sensed values. Note that for an embodiment the sensor includes one sensor, and for another embodiment the sensor includes a group of sensors. For at least some embodiments, operation of associated devices in the sensor network such as badging system, switches, A/V device, equipment etc. trigger the obtaining of sensed values from the sensor or the sensor group associated with the device.

For at least some embodiments, data sets are collected from the sensors or from groups of sensors as well as associated devices. For at least some embodiments, each data set is time stamped for further analysis such as simultaneous activity occurrences, sequential or causal activity occurrences and pre-activity or post-mortem activity occurrences. For at least some embodiments, correlations between the data sets of different sensors and devices can be determined by comparing the time stamping of the data sets.

For at least some embodiments, the controller is further operative to select at least a sub-plurality of the plurality of sensors. That is, the sub-plurality includes a group of sensors that is used to determine the predicted state rather than just a single sensor.

For at least some embodiments, the sub-plurality refers to the group of sensors acting as one (that is jointly operating) for the purpose of future state prediction. For example, the multiple sensors in a closed room (such as conference room, private office) act as one for predicting future occupancy of the room. Other examples of spaces include a lobby area, and/or small labs.

For at least some embodiments, other available information of the built environment is used to classify the sensed values, or to influence the predicted state. For at least some embodiments, the other available information includes information of a space of the built environment that is different than the space of the built environment that is associated with the corresponding one of the plurality of sensors that generated the sense value. That is, for example, sensor information of a space proximate to the space of a sensor is used to classify the sensed values of the sensor, or to influence the predicted state of the space associated with the sensor. For at least some embodiments, the sensor information of proximate spaces is referred to as neighborhood information. For an embodiment, the other available information includes sensed occupancy of the different space of the built environment. For at least some embodiments, the different space information is referred to as influencing group information.

For at least some embodiments, the other available information of the built environment includes other system information such as badging, calendar events, outside environment data, equipment sign-in logs and derived intelligent data such as type of occupancy, level of occupancy etc. The other system information is information that has been identified as having an impact on the predicted state of the space in question.

For at least some embodiments, the other available information of the built environment includes sensed values of a group of sensors of a neighborhood group, wherein the group of sensors of the neighborhood group are located adjacent to the sub-plurality of sensors, and wherein the group of sensors of the neighboring group have past sensed values that are correlated with past predicted future states of the sub-plurality of sensors by more than a threshold. For at least some embodiments, determining that the group of sensors of the neighboring group have past sensed values that are correlated with past predicted future states of the sub-plurality of sensors by more than a threshold includes identifying that a predicted state based on the sensed values of the neighboring group is observed to be accurate greater than a threshold percent of time. Accurate means correctly predicted future state.

For example, a space (such as, a first room) located adjacent to a space (such as, a second room) associated with the sub-plurality of sensor may include a neighborhood group of sensors. That is, the neighboring group of sensors is located adjacent to the sub-plurality (also a group) of sensors. Additionally, a predicted state of the sensed signals of the neighboring group is determined to be correlated with a resulting (what actually happens) state of the sub-plurality (group) of sensors. For at least some embodiment, the correlation is established by observing the sensed values of the neighboring group sensor and the resulting state of the space of the sub-plurality of sensor over time.

For at least some embodiments, the other available information of the built environment includes sensed values of a group of sensors of a influencing group, wherein the group of sensors of the influencing group are not located adjacent to the sub-plurality of sensors, and wherein the group of sensors of the influencing group have past sensed values that are correlated with past predicted future states of the sub-plurality of sensors by more than a threshold. For at least some embodiments, determining that the group of sensors of the influencing group have past sensed values that are correlated with past predicted future states of the sub-plurality of sensors by more than a threshold comprises identifying that a predicted state based on the sensed values of the influencing group is observed to be accurate greater than a threshold percent of time.

For example, a space (such as, a first room) not located adjacent to a space (such as, a second room) associated with the sub-plurality of sensor may include an influencing group of sensors. That is, the influencing group of sensors is not located adjacent to the sub-plurality (also a group) of sensors. Additionally, a predicted state of the sensed signals of the influencing group is determined to be correlated with a predicted state of the sub-plurality (group) of sensors. For at least one embodiment, the correlation is established by observing the sensed values of the influencing group sensor and the resulting state of the space of the sub-plurality of sensor over time.

For at least some embodiments, the collected sensed values are classified in space and time dimensions. Space dimension is defined in any of the following or a combination criteria—coverage area of the sensor, coverage area of the physical neighborhood sensors, coverage area of the influencing group of sensors (such as sensors that may not be physically adjacent but functionally influencing. For example, lobby sensors or parking lot sensors influence many of the sensor groups in building in preparing (determining the predicted state) the building for occupants. Further, sensors in badge entry influence the predicted state of, for example, a private office.

For at least some embodiments, the time dimension is define in any of the following or a combination criteria—time window such as the number of seconds, minutes, hours, day of the week such as weekday and weekends or mon/ tues/wed etc, week of the year n weeks or weeks [x to y] or week 1, 2 3 . . . 52, month of the year such as n months or months [x to y] or month 1, 2, . . . 12, quarter of the year such as n quarters, quarter [x to y] or quarter 1, 2, 3, 4, years such as n years or years [x to y] or year 2014, 2015 etc.

For at least some embodiments, a future state of each of the plurality of sensors is predicted based at least in part on the classifications of each of the sense values, and the future state is communicated. For at least some embodiments, the predicted state includes at least one of occupancy, energy consumption, and/or an environmental control state.

Each of these predicted states can be utilized to provide more efficient control of the built environment. For example, occupancy and/or energy use of the space can be more efficiently scheduled and planned.

For at least some embodiments, the state of the system is defined as collection occupancy or energy information in space and time dimensions for sensors of the space in question. For example, an occupancy state of sensor x in future time window where time window is defined as per criteria shown in time dimension=function of (current occupancy state of the sensor x, current occupancy state of x's neighborhood sensors, current occupancy state of x's influencing group sensors, sequence of previous time window states of {sensor x, x's neighborhood, x's influencing group} where previous time windows are defined in the criteria shown in time dimension that is appropriate for sought future time, coefficients of each of the previous time windows and space dimensions that indicates the influence of these parameters on future state of x). Note that x can be group of sensor or a single sensor.

For at least some embodiments, the future state is the state of the system in the future time period where the state of the system is defined as collection occupancy or energy information in space and time dimensions for sensors of the space in question. For the example detailed above, the future state is the predicted occupancy and/or energy consumption at a future time window for sensor x.

For at least some embodiments, weighting is utilized for classifying each of the collected sense values based on the type of space of the built environment associated with the corresponding one of the plurality of sensors that generated the sense value, based on the timing of the sense value, and based on the other available information of the built environment. That is, weights are determined for each of the type of space of the built environment associated with the corresponding one of the plurality of sensors that generated the sense value, the timing of the sense value, and each of a plurality of other available information of the built environment.

For at least some embodiments, the other available information includes sensed occupancy of the space of the built environment that is different than a space of the built environment that is associated with the corresponding one of the plurality of sensors that generated the sense value. That is, for example, sensed occupancy of the different space can be observed over time to be correlated with future occupancy of the space of the built environment that is associated with the corresponding one of the plurality of sensors that generated the sense value. For example, the space of the built environment that is associated with the corresponding one of the plurality of sensors that generated the sense value may be a conference room, and the different space may be a corridor that leads to the conference room. Over time (as correlations are observed), occupancy of the corridor may be determined to be a predictor of future occupancy of the conference room.

For at least some embodiments, the weighting is adaptive. For a least some embodiments, the adaptive weighting is adaptively updated over time based on observations of an accuracy of past-predicted future states. That is, after a predicted state is determined using present weighting, the predicted state is compared to what the actual state is determined to be. For example, based on the comparison, the weighting can be adjusted to provide better future estimates.

For at least some embodiments, the adaptive weighting is updated over time based on a determined accuracy of the predicted state based on the type of space of the built environment associated with a corresponding one of the plurality of sensors that generated the sense value. That is, for at least some embodiments, the type of space of the sensor or group (sub-plurality) of sensors is used to predict the future state. For at least some embodiments, the weighting or contribution based on the type of space of the sensor or group (sub-plurality) of sensors is adjusted based on the accuracy of the predicted state. The weighting can be increased if this factor is better than other factors in accurately predicting the future state.

For at least some embodiments, the adaptive weighting is updated over time based on a determined accuracy of the predicted state based on the timing of the sense value. That is, for at least some embodiments, the on the timing of the sense value is used to predict the future state. For at least some embodiments, the weighting or contribution based on the timing of the sense value is adjusted based on the accuracy of the predicted state. The weighting can be increased if this factor is better than other factors in accurately predicting the future state.

For at least some embodiments, the adaptive weighting is updated over time based on a plurality of the other available information of a plurality of the other available information of the built environment is used to predict the future state. For at least some embodiments, the weighting or contribution based on the plurality of the other available information of the built environment is adjusted based on the accuracy of the predicted state. The weighting can be increased if this factor is better than other factors in accurately predicting the future state. The other available information can include a plurality of factors, wherein each of these factors can be weighted as well.

For at least some embodiments, the weights are adaptively derived from a probabilistic model that indicates the influence of a past state in determining the future state. Therefore, the probabilistic model develops a vector of weights for each past state and an adaptive algorithm is executed using the past states and their weights to determine the highly probable future state. In addition, the vector weights are adjusted adaptively (and the model is re-run) as the time passes with validation of accuracy prediction to actual occurrence. For at least some embodiments, the sensed value classification (that is, for example, the weighting) for the neighboring and influencing groups are updated based on validation of accuracy of prediction.

For at least some embodiments, predicting the future state of each of the plurality of sensors based at least in part on the classifications of each of the sense values includes an analysis of the type of space associated with the sensor, an identifier of the sensor, a present time, and a predicted time.

For at least some embodiments, the identifier of a sensor or a group of sensors is the signature of the sensor or the group of sensors based on past sensed values of the sensor or the group of sensors, past sensed values of neighboring sensors', past sensed values of influencing sensor groups and other information including past and configured of the built environment the sensor belongs to.

For at least some embodiments, a predicted state is determined for a group of sensors rather than for just a single sensor. That is, for an embodiment, the predicted state of a space is based on the group of sensors that provide coverage of the space. That is, the group of sensors is capable of sensing an area occupied by the space. Further, for an embodiment, the predicted state of the space is based on the group of sensors representing the space, neighborhood sensors and/or influencing group sensors. Neighborhood sensors are sensors adjacent to the group of sensors. Influencing sensors are sensors that have been determined to have a correlation with the group of sensors. That is, the influencing sensors are sensors that have been determined to reliably predict sensing of the group of sensors. This can be determined by tracking and correlating the sensing of the group of sensors with sensing of the influencing sensors. For at least some embodiments, this is performed as part of adaptive module of prediction system.

For at least some embodiments, the predicted state of the space is based on the sensed values of sensors associated with the space (for example, the group of sensors), neighborhood sensors and the influencing group of sensors. For at least some embodiments, sensed values utilized for determining the predicted state include values recorded by the sensors in space/neighborhood/influencing group, and additional/alternate sources such as the building systems (such as badging, equipment etc.), derived intelligent data set such as level or type of occupancy.

For at least some embodiments the influencing groups of sensors is configured as well as determined adaptively based on how the spaces (for example, the space in question and other proximate spaces) interact with each other over time. For at least some embodiments, the correlation between sensed occupancy of the space and sensed occupancy as indicated by the influencing group of sensor is monitored over time. The greater the correlation between occupancy of the space and occupancy as indicated by the influencing group of sensors, the greater the weight of the influencing sensors in determination of the predicted state of the space. For example, in a building with multiple lobbies (or entry points) not all spaces in the building have all lobbies in their influencing group if the past pattern of entry indicates association of a specific lobby to specific space of occupants. The same situation applies for other influencing groups such as parking lots, cafeteria etc.

For at least some embodiments, the controller is further operative to classify each of the collected sense values based on the selected at least the sub-plurality of the plurality of sensors. That is, the sensed values are at least partially classified based on the selected grouping of sensors associated with the space.

For at least some embodiments, the controller is further operative to predict a future state of the sub-plurality (group) of the plurality of sensors.

For at least some embodiments, the other available information of the built environment includes at least one of badging data, calendar event data, outside environment data, equipment sign-in log data, parking lot system data, other control systems in and outside of building such as AN, DMX, other sensor data availed via APIs or direct interaction with systems in and outside of building.

For at least some embodiments, the future state includes a probability of a location of each sensor being occupied or not occupied. For at least some embodiments, the future state includes a probability of locations of the sub-plurality of sensor being occupied or not occupied. For at least some embodiments, the level of occupancy (number of occupants) in comparison to a threshold for a future time interval is predicted based on correlation of sensed values from multiple sensors in a space.

For at least some embodiments, the controller is further operative to predict energy consumption based on the future state.

For at least some embodiments, the controller is further operative to predict space utilization based on the future state.

For at least some embodiments, the controller is further operative to influence future predicted states base upon feedback of a determination of a determined accuracy of the predicted state. That is, a determination is made as to how accurate a predicted state was. This can be feedback to improve future prediction.

For at least some embodiments, the controller continuously validates the accuracy of prediction with actual occurrences as the time passes. For at least some embodiments, this validation data is used adaptively to update the weights of past data and thereby improving the accuracy as predicted state with time. For at least some embodiments, this validation data is used adaptively to reclassify the sensed values in the neighborhood and influencing groups to improve the accuracy of future predictions.

For at least some embodiments, the controller is further operative to perform training, including tracking a set of known states over time; wherein the controller is further operative to influence future predicted states based the training.

Flow of Future State Prediction

For at least some embodiments, past signatures of at least one of each sensor or a group of the sensors are classified and modeled using probabilistic models. Further, for an embodiment, if available, other system data is included in the model such as badging, calendar events, outside environment data, equipment sign-in logs etc. For at least some embodiments, using the models, the state of sensor (such as occupancy, energy consumption, environmental control state etc) is predicted. For at least some embodiments, the predicted state is communicated to sensor network and environmental control systems.

Example Usages

For at least some embodiments, the predicted states are utilized in an in HVAC (heating, ventilation and air conditioning) system. In HVAC, for at least some embodiments, the predicted state is utilized for optimizing energy consumption. For example, predicted occupied state in the future can result in chiller/heater management in efficient modes to prepare the space for future occupancy. For at least some embodiments, the predicted lack of occupancy in future can result in switching off the chiller/heater to let the temperature drift provided the temperature is within the allowed range during the period of current occupancy. In addition, for a VAV space with multiple sensors, predicted level of occupancy (low/med/high) can be used for efficiently running the chiller/heater system. To participate in DR programs, future state prediction is necessary to ensure that the committed savings can be achieved at the level of need in future state.

For at least some embodiment, the predicted states are utilized for space resource management. In space resource management, for at least some embodiments, the future state prediction of space is helpful to manage the space utilization. For example, low occupancy prediction of multiple hoteling spaces will enable the facility manager to consolidate hoteling space occupants by shutting down a few spaces for specific period of time. In retail, expected occupancy level in the future will enable planning for service levels by staffing appropriately. In parking lots low or high predicted occupancy in future states will enable the management to light up (or darken) the spaces in order to avoid sporadic parking practices to efficiently manage the spaces.

For at least some embodiments, the controller of a sensor unit (for at least some embodiments, a building fixture) is operative to predict the future state of the space associated with the sensor. For at least some embodiments, the controller is separate from the sensor but within a network associated with the sensor, and is operative to predict the future state of the space associated with the sensor, and communicate the predicted future state to the sensor. For at least some embodiments, the controller is separate from the network associated with the sensor (for example, for at least some embodiments the controller is a part of the cloud), and is interfaced with the network associated with the sensor. Further, the controller within the cloud is operative to predict the future state of the space associated with the sensor, and communicate the predicted future state to the sensor.

Figure 2:
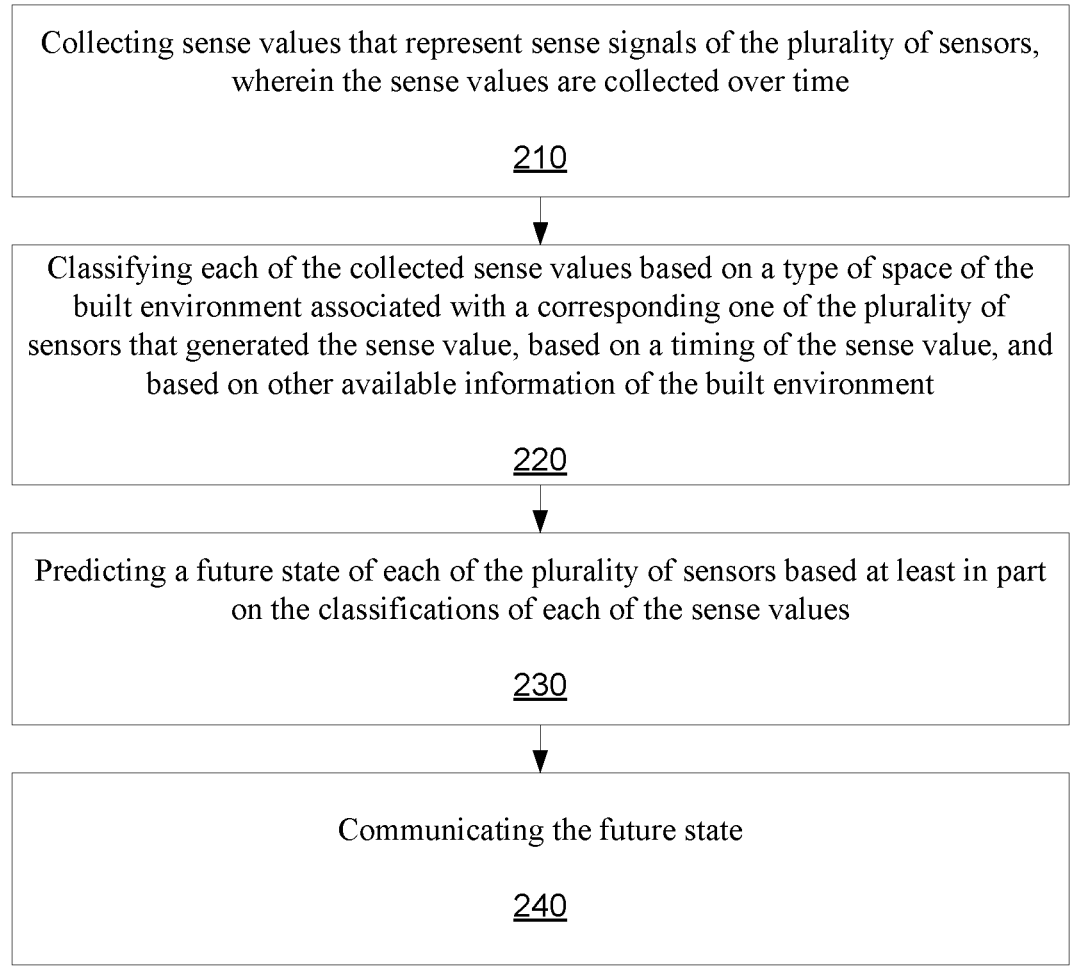
FIG. 2 is a flow chart that includes steps of a method predicting a state within a built environment, according to an embodiment.

FIG. 2 is a flow chart that includes steps of a method predicting a state within a built environment, according to an embodiment. A first step 210 includes collecting sense values that represent the sense signals of the plurality of sensors, wherein the sense values are collected over time. A second step 220 includes classifying each of the collected sense values based on a type of space of the built environment associated with a corresponding one of the plurality of sensors that generated the sense value, based on a timing of the sense value, and based on other available information of the built environment. A third step 230 includes predicting a future state of each of the plurality of sensors based at least in part on the classifications of each of the sense values. A fourth step 240 includes communicating the future state.

FIG. 3 is a flow chart that includes steps of another method predicting a state within a built environment, according to an embodiment. A first step 310 includes collecting sense values that represent sense signals of the plurality of sensors of a built environment, wherein the sense values are collected over time. A second step 320 includes predicting a future state of each of the plurality of sensors based at least in part on a type of space of the built environment associated with a corresponding one of the plurality of sensors that generated the sense value, based on a timing of the sense value, and based on other available information of the built environment. A third step 330 includes communicating the future state.

As previously described, for an embodiment, the other available information includes information of a space of the built environment that is different than the space of the built environment that is associated with the corresponding one of the plurality of sensors that generated the sense value. For at least some embodiments, the other available information includes sensed occupancy of the different space of the built environment.

As previously described, for at least some embodiments, a plurality or sub-plurality of sensors are selected for determining the future state of a space. As previously described, for at least some embodiments, each of the collected sense values are classified based on the selected at least the sub-plurality of the plurality of sensors. As previously described, for at least some embodiments, a future state of the sub-plurality of the plurality of sensors is predicted.

As previously described, for at least some embodiments, the other available information of the built environment includes at least one of badging data, calendar event data, outside environment data, equipment sign-in log data.

As previously described, for at least some embodiments, the future state includes a probability of a location of each sensor being occupied or not occupied. As previously described, for at least some embodiments the future state includes a probability of locations of the sub-plurality (groups) of sensor being occupied or not occupied.

As previously described, for at least some embodiments the controller is further operative to predict energy consumption based on the future state. As previously described, for at least some embodiments the controller is further operative to predict space utilization based on the future state.

Figure 4:
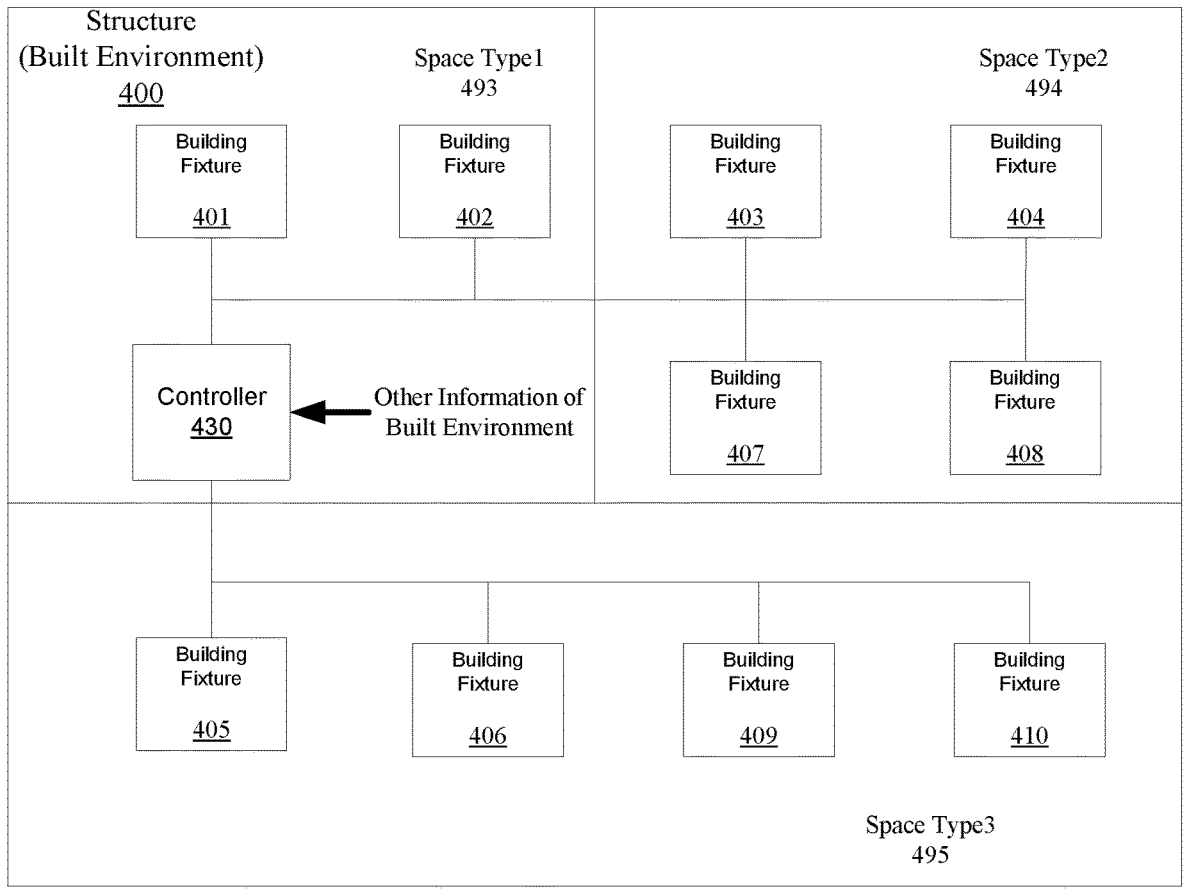
FIG. 4 shows a building fixture sensor network for predicting a state within a built environment, according to an embodiment.

FIG. 4 shows a building fixture sensor network for predicting a state within a built environment, according to an embodiment. For this embodiment, the sensors are included within building fixtures 410-410. For an embodiment, the building fixtures are light fixtures. For at least some embodiments, one or more of the building fixtures 410-410 include anyone of the previously described sensors.

For at least some embodiments, the sensor network includes a controller 430. While the controller 430 of FIG. 4 is shown as a standalone controller, it is to be understood that the functionality of the controller 430 can be distributed amongst any number of controllers, computers or server. For an embodiment, one or more of the building fixtures 410-410 include one or more controllers. For at least some embodiments, the one or more controllers of the one or more building fixtures 410-410 are operative to perform the functionality of the controller 430.

For at least some embodiments, the controller 430 is operative to collect sense values that represent sense signals of the plurality of sensors of the plurality of building fixtures 410-410, wherein the sense values are collected over time, classify each of the collected sense values based on a type of space of the built environment associated with a corresponding one of the plurality of sensors that generated the sense value, based on a timing of the sense value, and based on other available information of the built environment, predict a future state of each of the plurality of sensors based at least in part on the classifications of each of the sense values, and communicate the future state.

For at least some embodiments, the collected sense values are classified based on a type of space of the built environment associated with a corresponding one of the plurality of sensors that generated the sense value. That is, the plurality of sensors of the plurality of building fixtures 410-410 is distributed within the built environment 400. For an embodiment, the built environment 400 includes different types of spaces 493, 494, 495. For example, a space type1 493 may include a restroom, a space type2 494 may include an office, and a space type3 495 may include a conference room. Other possible space types include, for example, an open office, meeting rooms, private offices, corridors, lobby, cafeteria, class rooms etc. where one or a group of sensors of the plurality of building fixtures 410-410 are installed. For at least some embodiments, the different space types defined by one of a group of sensors is tracked, and can be used to classify the sensed values, because the space type of each of the sensors is useful in determining the future state of the space associated with each of the sensors. Generally, the space associated with a sensor includes the space that is within the coverage area of the sensor. For example, a sensor installed in a ceiling of the space with a particular lens could have a coverage floor area of 100 Sq. Ft. This means, the occupancy, energy and environmental controls are tracked and associated with 100 Sq. Ft of the space.

For at least some embodiments, the sensed values are collected over time. The time interval can be periodic, or aperiodic. For an embodiment, the sensed values are obtained (sensed) once every interval of time, for example, once every 10 minutes, once an hour or once a day. For another embodiment, obtaining the sensed values is triggered on sensing, for example, motion. For another embodiment, the sensed values or obtained both periodically and non-periodically.

For another embodiment, occupant activity using a BLE (Blue-Tooth Low Energy) device within one or more of the plurality of building fixtures 410-410 in the coverage area of sensor or in the neighborhood coverage area of sensor or in the influencing group's coverage area is triggered to obtain sensed values. For at least some embodiments, an occupant's presence sensed by a BLE device in the coverage area of the sensor or in the neighborhood coverage area of the sensor or in the influencing group's coverage area triggers the obtaining of the sensed values. Note that for an embodiment the sensor includes one sensor, and for another embodiment the sensor includes a group of sensors. For at least some embodiments, operation of associated devices in the sensor network such as badging system, switches, A/V device, equipment etc. trigger the obtaining of sensed values from the sensor or the sensor group associated with the device.

Data sets are collected from the sensors or group of sensors of the plurality of building fixtures 410-410 as well as associated devices. For at least some embodiments, each data set is time stamped for further analysis such as simultaneous activity occurrences, sequential or causal activity occurrences and pre-activity or post-mortem activity occurrences. For at least some embodiments, correlations between the data sets of different sensors and devices can be determined by the time stamping of the data set.

For at least some embodiments, the controller is further operative to select at least a sub-plurality of the plurality of sensors of the plurality of building fixtures 410-410. That is, the sub-plurality includes a group of sensors is used to determine the predicted state rather than just a single sensor.

For at least some embodiments, the sub-plurality refers to the group of sensors acting as one (that is jointly operating) for the purpose of future state prediction. For example, the multiple sensors in a closed room (such as conference room, private office) act as one when the goal is to predict future occupancy of the room. Other examples include, lobby area, and/or small labs.

For at least some embodiments, other available information of the built environment is used to classify the sensed values, or to influence the predicted state. For at least some embodiments, the other available information includes information of a space of the built environment that is different than the space of the built environment that is associated with the corresponding one of the plurality of sensors that generated the sense value. That is, for example, sensor information of a space proximate to the space of a sensor is used to classify the sensed values of the sensor, or to influence the predicted state of the space associated with the sensor. For at least some embodiments, the sensor information of proximate spaces is referred to as neighborhood information. For an embodiment, the other available information includes sensed occupancy of the different space of the built environment. For at least some embodiments, the different space information is referred to as influencing group information.

For at least some embodiments, the other available information of the built environment includes both other system information such as badging, calendar events, outside environment data, equipment sign-in logs and derived intelligent data such as type of occupancy, level of occupancy etc.

Figure 5:
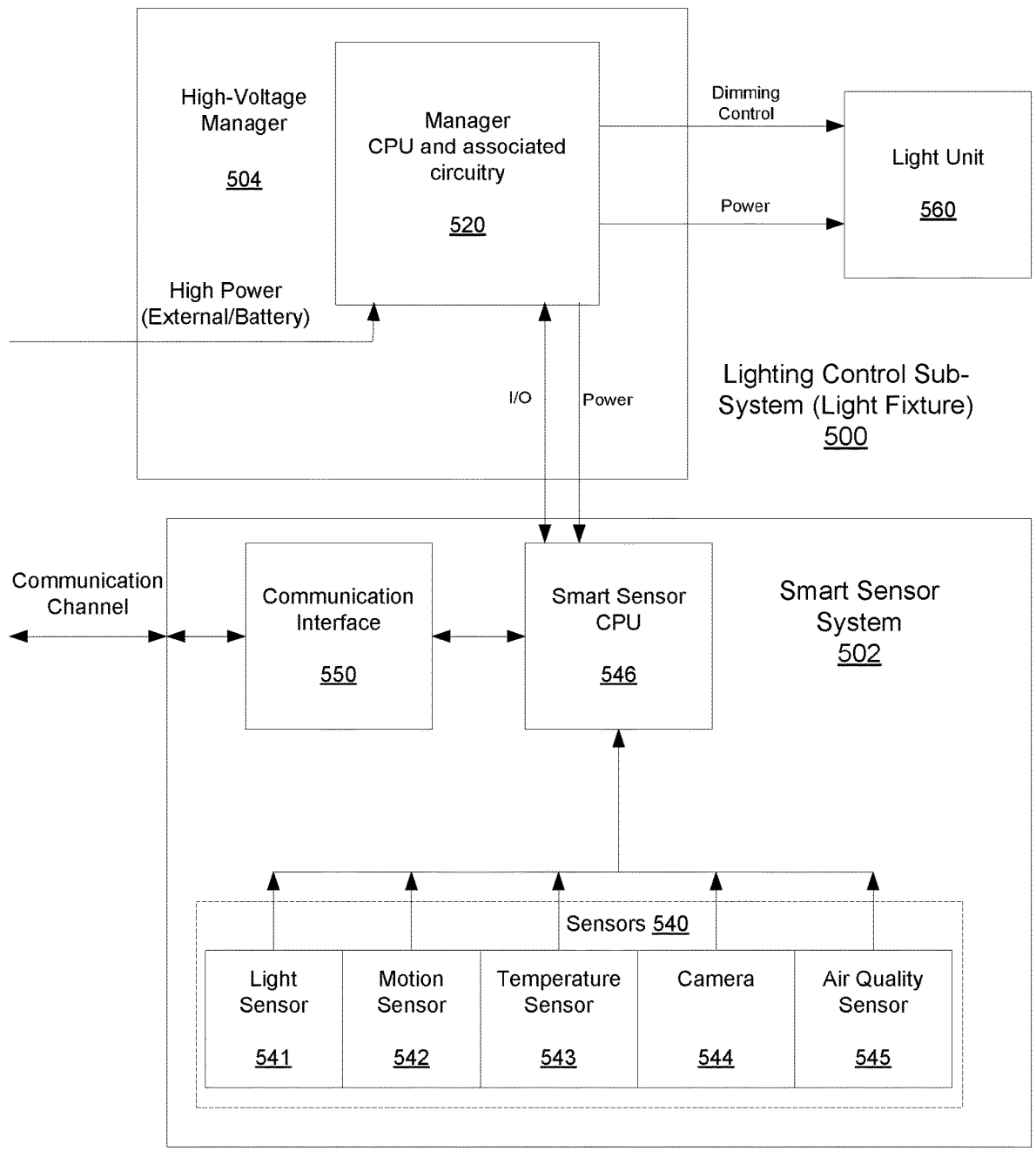
FIG. 5 shows a building fixture, according to an embodiment.

FIG. 5 shows a building fixture 500, according to another embodiment. This embodiment of the light fixture 500 includes a high-voltage manager 504 and a smart sensor system 502 that include a manager CPU 520 and smart sensor CPU 546 that operate in conjunction as a controller that independently manages and controls the operation of a lighting unit 560. The light fixture 500 can include any combination of sensors 540, such as, a light sensor 541, a motion sensor 542, a temperature sensor 543, a camera 544, and/or an air quality sensor 545. The light fixture 500 can receive profiles from elsewhere over a communications channel.

For the embodiment of FIG. 5, the high-voltage manager 504 receives a high voltage (for example, 120 Volts) and generates a power supply voltage for both the smart sensor system 502 (for example, 5 Volts) and the lighting unit 560, and a dimming control for the lighting unit 560. For this embodiment, both the high-voltage manager 504 and the smart sensor system 502 include CPUs (central processing units) 520 and 546 which operate in conjunction to control the lighting unit 560. While shown as separate controllers, it is to be understood that the operations and functionality of the two CPUs could be included within a single controller.

The previously describe direct communication link can be established using any one or more of the sensors of the lighting fixture 500. The light sensor 541 and the motion sensor 542 are likely candidates, but the possibilities are open. For example, some embodiments of camera sensors can be utilized as motion sensor, which can be used to establish the direct link. A user device establishes the direct communication link with the lighting fixture 500, for example, by pulsing a light which is received or sensed by the light sensor 541. Alternatively, or additionally, the user device establishes the direct communication link with the lighting fixture 500 through motion that is sensed by the motion sensor 542.

As shown, the light fixture 500 includes the light unit 560. It is to be understood that the light unit 560 could alternatively be external to the controller. For this embodiment, the controller (manager CPU 520 and smart sensor CPU 546) can include outputs to effect the light level changes. For example, the outputs can control relays to turn lights on and off, and control 0-10 V or PWM (pulse width modulation) outputs for dimming. The controller 520 can include a standard chipset that integrates a microprocessor unit, and interface for communicating different program instructions, and several ports for communicating with electronic devices.

The light fixture 500 additionally includes an interface 1050 550 that allows the lighting fixture to communicate with the central controller through the second communications link. The interface 550 can be a wired (for example ETHERNET®), or the interface can be wireless (for example, ZIGBEE®). The interface 550 can provide a direct link to the central controller, or the interface can provide an intermediate link to an intermediate device (such as the previously described gateway).

While the lighting fixture 500 provides lighting control, it is to be understood that the equivalent fixtures for controlling other environmental parameters, such as, light, temperature, and humidity can additionally or alternatively be implemented according to the described embodiments. Accordingly, the control information can include at least one of light intensity, lighting scenes, thermostat, and/or a security alarm.

For embodiments, the second communication link comprises at least one of a cellular link to a service provider wherein the central controller is connected to the service provider, or an 802.11 wireless link between the user device and the central controller.

An Embodiment of the Prediction Processing

For an embodiment, the energy consumption state data for sensor or group 'i' is represented by $\zeta_i(t)$. For an embodiment, the energy consumption is $\zeta_i(t)=\{$Energy data of sensor or group 'i' from time t=0 to a present time, Energy data of the neighborhood group from time t=0 to the present time, and/or energy data of influencing group from time t=0 to the present time$\}$.

For an embodiment, the Occupancy information state for sensor or group 'i' is represented by $\varphi_i(t)$. For an embodiment, $\varphi_i(t)=\{$Occupancy data of sensor or group 'i' from time t=0 to the present time, Occupancy data of the neighborhood group from time t=0 to the present time, and/or Occupancy data of influencing group from time t=0 to the present time$\}$.

For at least some embodiments, the previously described weights of sensor or group of sensors 'i's energy data is represented by $\alpha_i(t)$. For at least some embodiments, weights of sensor or group of sensors 'i's occupancy data is represented by $\beta_i(t)$. For at least some embodiments, other information of sensor or group 'i' is represented by $\gamma_i(t)$.

For at least some embodiments, a prediction function model f is defined as a combination of stochastic model defining the state transition probabilities and an adaptive multi-variate regressive model defining a method of adaptability and prediction of future state. For an embodiment, this function f is represented by predicted future energy consumption associated with space covered by sensor or group 'i', which is represented by $\zeta_i(t+x)=f(\zeta_i(t), \varphi_i(t), \alpha_i(t), \beta_i(t), \gamma_i(t))$. The predicted future occupancy status or level of space associated with a sensor or group 'i' is represented by $\varphi_i(t+x)=f(\varphi_i(t), \beta_i(t), \gamma_i(t))$. For notation purpose, the same weights symbol is used for both energy and occupancy prediction. But, in reality, the actual values in the weights may differ based on correlations.

Although specific embodiments have been described and illustrated, the described embodiments are not to be limited to the specific forms or arrangements of parts so described and illustrated. The embodiments are limited only by the appended claims.

What is claimed:

1. A sensor network, comprising:
    a plurality of sensors of a built environment, each sensor operative to generate a sense signal;
    an HVAC (heating, ventilation and air conditioning) unit of the built environment;
    a controller, the controller operative to:
        collect sense values that represent sense signals of the plurality of sensors, wherein the sense values are collected over time;
        classify each of the collected sense values based on a type of space of the built environment associated with a corresponding one of the plurality of sensors that generated the sense value, based on a timing of the sense value, and based on other available information of the built environment, wherein classifying each of the collected sense values comprises:
            weighting the type of space of the built environment associated with a corresponding one of the plurality of sensors that generated the sense value, weighting the timing of the sense value, and weighting each of a plurality of the other available information of the built environment; and
            classifying each of the collected sense values based on the weighting of the type of space of the built environment associated with a corresponding one of the plurality of sensors that generated the sense value, the weighting of the timing of the sense value, and the weighting of each of the plurality of the other available information of the built environment;
        predict a future state of each of the plurality of sensors based at least in part on the classifications of each of the sense values;
        communicate the future state; and
        control the HVAC based on the future state.

2. The sensor network of claim 1, wherein the other available information includes information of a space of the built environment that is different than a space of the built environment that is associated with the corresponding one of the plurality of sensors that generated the sense value.

3. The sensor network of claim 2, wherein the other available information includes sensed occupancy of the space that is different that the space of the built environment that is associated with the corresponding one of the plurality of sensors that generated the sense value.

4. The sensor network of claim 1, wherein the weighting is adaptive.

5. The sensor network of claim 4, wherein the adaptive weighting is adaptively updated over time based on observations of an accuracy of past predicted future states.

6. The sensor network of claim 4, wherein the adaptive weighting is updated over time based on:
- a determined accuracy of the predicted state based on the type of space of the built environment associated with a corresponding one of the plurality of sensors that generated the sense value;
- a determined accuracy of the predicted state based on the timing of the sense value; and
- a determined accuracy of the predicted state based a plurality of the other available information of the built environment.

7. The sensor network of claim 1, wherein predicting the future state of each of the plurality of sensors based at least in part on the classifications of each of the sense values comprises an analysis of the type of space associated with the sensor, an identifier of the sensor, a present time, and a predicted time.

8. The sensor network of claim 1, wherein the controller is further operative to select at least a sub-plurality of the plurality of sensors.

9. The sensor network of claim 8, wherein the controller is further operative to classify each of the collected sense values based on the selected at least the sub-plurality of the plurality of sensors.

10. The sensor network of claim 8, wherein the controller is further operative to predict a future state of the sub-plurality of the plurality of sensors.

11. The sensor network of claim 8, wherein the other available information of the built environment includes sensed values of a group of sensors of a neighborhood group, wherein the group of sensors of the neighborhood group are located adjacent to the sub-plurality of sensors, and wherein the group of sensors of the neighboring group have past sensed values that are correlated with past predicted future states of the sub-plurality of sensors by more than a threshold.

12. The sensor network of claim 11, wherein determining that the group of sensors of the neighboring group have past sensed values that are correlated with past predicted future states of the sub-plurality of sensors by more than a threshold comprises identifying that a predicted state based on the sensed values of the neighboring group is observed to be accurate greater than a threshold percent of time.

13. The sensor network of claim 8, wherein the other available information of the built environment includes sensed values of a group of sensors of a influencing group, wherein the group of sensors of the influencing group are not located adjacent to the sub-plurality of sensors, and wherein the group of sensors of the influencing group have past sensed values that are correlated with past predicted future states of the sub-plurality of sensors by more than a threshold.

14. The sensor network of claim 13, wherein determining that the group of sensors of the influencing group have past sensed values that are correlated with past predicted future states of the sub-plurality of sensors by more than a threshold comprises identifying that a predicted state based on the sensed values of the influencing group is observed to be accurate greater than a threshold percent of time.

15. The sensor network of claim 1, wherein the other available information of the built environment includes at least one of badging data, calendar event data, outside environment data, equipment sign-in log data.

16. The sensor network of claim 1, wherein the future state includes a probability of a location of each sensor being occupied or not occupied.

17. The sensor network of claim 16, wherein the future state includes a probability of locations of the sub-plurality of sensor being occupied or not occupied.

18. The sensor network of claim 16, wherein the future state includes an estimated level of occupancy, wherein the level of occupancy is estimated based on correlating predicted states of the sub-plurality of the plurality of sensors with a secondary occupancy level source.

19. The sensor network of claim 1, wherein the controller is further operative to predict energy consumption based on the future state.

20. The sensor network of claim 1, wherein the controller is further operative to predict space utilization based on the future state.

21. The sensor network of claim 1, wherein the controller is further operative to influence future predicted states base upon feedback of a determination of a determined accuracy of the predicted state.

22. The sensor network of claim 1, wherein the controller is further operative to perform training, including tracking a set of known states over time, wherein the controller is further operative to influence future predicted states based the training.

23. The sensor network of claim 1, wherein each sensor includes a sensor controller, and wherein the sensor controller is operative to:
- collect the sense values that represent sense signals of the plurality of sensor, wherein the sense values are collected over time;
- classify each of the collected sense values based on a type of space of the sensor, and based on a timing of the sense value;
- predict a future state of the sensor; and
- communicate the future state.

* * * * *